United States Patent [19]
Hama et al.

[11] Patent Number: 5,589,966
[45] Date of Patent: Dec. 31, 1996

[54] ANTIFERROELECTRIC LIQUID CRYSTAL LIGHT MODULATION DEVICE

[75] Inventors: Hideo Hama; Yukari Sakai, both of Sodegaura, Japan

[73] Assignee: Mitsui Petrochemical Industries, Ltd., Tokyo, Japan

[21] Appl. No.: 237,120

[22] Filed: May 3, 1994

[30] Foreign Application Priority Data

May 11, 1993 [JP] Japan .................................. 5-109512

[51] Int. Cl.⁶ .......................... G02F 1/141; G02F 1/1347
[52] U.S. Cl. .......................... 349/194; 349/196; 349/117; 349/96
[58] Field of Search .............................. 359/53, 93, 63, 359/65, 73, 100, 36, 37, 39

[56] References Cited

U.S. PATENT DOCUMENTS

| | | | |
|---|---|---|---|
| 4,367,924 | 1/1983 | Clark et al. | 359/100 |
| 4,772,943 | 9/1988 | Nakagawa et al. | 358/92 |
| 5,078,477 | 1/1992 | Jono et al. | 359/91 |
| 5,089,905 | 2/1992 | Sasaki et al. | 359/81 |
| 5,168,381 | 12/1992 | Walba | 359/53 |
| 5,347,378 | 9/1994 | Handschy et al. | 359/53 |
| 5,367,391 | 11/1994 | Johno et al. | 359/56 |
| 5,381,253 | 1/1995 | Sharp et al. | 359/53 |
| 5,392,142 | 2/1995 | Mitsutake et al. | 359/73 |

FOREIGN PATENT DOCUMENTS 2578994  9/1986  France.

OTHER PUBLICATIONS

Patel, et al., Optical Engineering, May (1987), vol. 26, No. 5, pp. 373–384.
McAdams, et al., Applied Optics, Mar. (1990), vol. 29, No. 9, pp. 1304–1307.
McAdams, et al., Optical Letters, Oct. (1990), vol. 15, No. 20, pp. 1150–1151.
Patent Abstracts of Japan, (Jun. 3, 1993), vol. 017, No. 290 (P–1549).
Wagner, et al., "Electrically controlled optical switch for multimode fiber applications", Applied Optics, Sep. (1980), vol. 19, pp. 2921–2925.
Chandani, et al., "Antiferroelectric Chiral Smectic...", Jap. J. App. Phys., Jul. (1989), vol. 28, No. 7, pp. L1265–L1268.

*Primary Examiner*—William L. Sikes
*Assistant Examiner*—Tai V. Duong
*Attorney, Agent, or Firm*—Sherman and Shalloway

[57] ABSTRACT

The liquid crystal light modulation device of the present invention comprising a liquid crystal element consisting of one of plural liquid crystal cells and a voltage signal input means electrically connected with the liquid crystal element, wherein each liquid crystal cell contains a chiral smectic liquid crystal material layer and when a voltage signal is input to the liquid crystal element, the polarization direction of a light transmitted by the liquid crystal element is changed by approx. 90° as compared with the state where the voltage signal is not input to the liquid crystal element enables a change of a light path and an open-close (on-off) operation of a light path at a high speed (optical switching time: not longer than 1 msec).

4 Claims, 11 Drawing Sheets

⊙ ··· Spontaneous polarization (up)
⊗ ··· Spontaneous polarization (down)

⊗ ··· Spontaneous polarization (down)

⊙ ··· Spontaneous polarization (up)

Change in a specific intensity of transmitted light through the liquid crystal cell in the liquid crystal light modulation element (Example I)
d = 5.5 μm
$I_0$ : Intensity of an incident light
$I_1$ : Intensity of an outgoing light polarized in parallel to the incident light
$I_2$ : Intensity of an outgoing light polarized vertically to the incident light

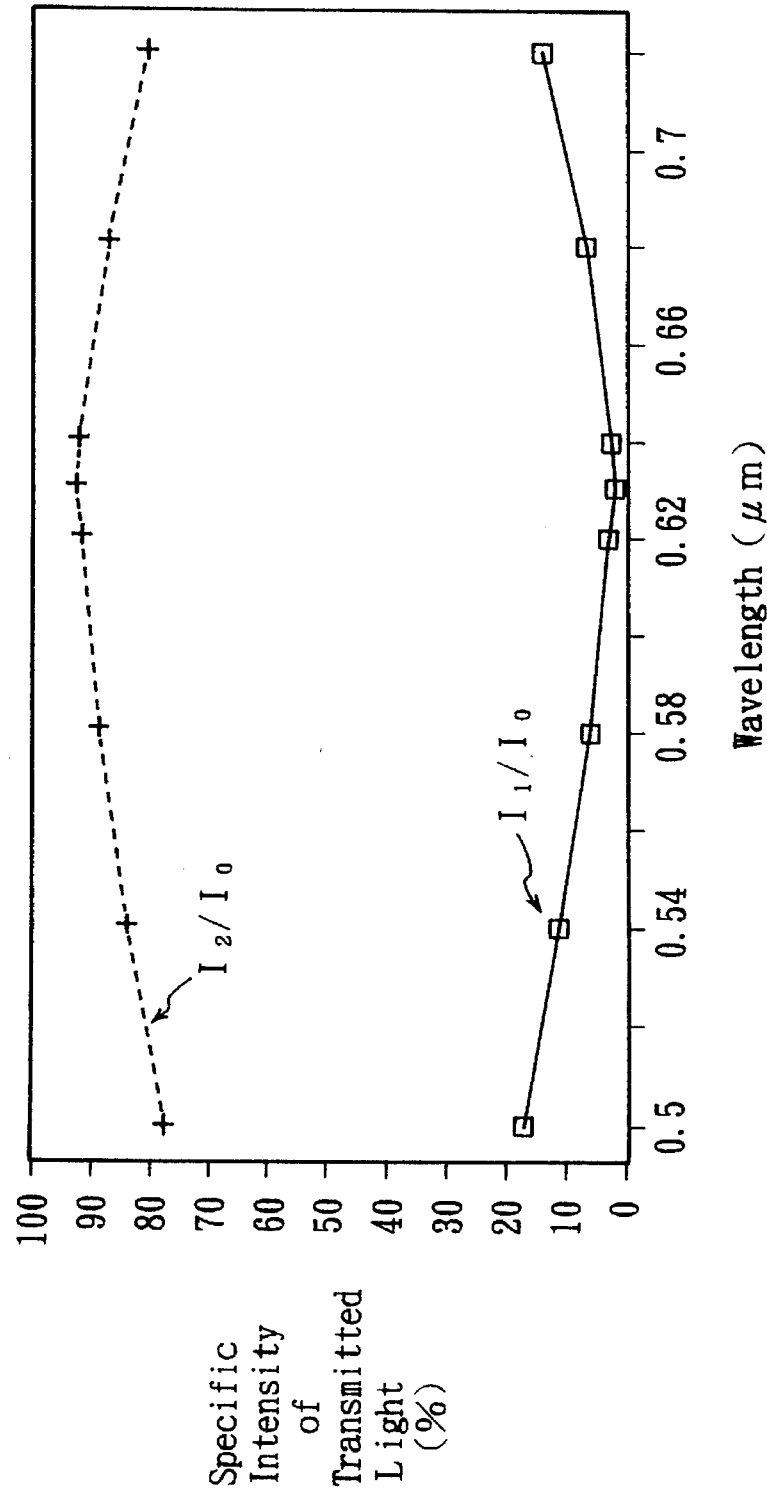

ANTIFERROELECTRIC LIQUID CRYSTAL LIGHT MODULATION DEVICE

FIELD OF THE INVENTION

The present invention relates to a liquid crystal light modulation device, and more particularly to a light modulation device which is preferable to an optical switching device for use of a high-speed change of a light path (a light path way) and to an optical shutter for use of a high-speed open-close (on-off) operation of a light path.

BACKGROUND OF THE INVENTION

In fields of optical communication art, stereoscopic image display art, etc., light modulation devices capable of realizing a high-speed change of a light path and a high-speed open-close (on-off) operation of a light path have been desired.

The technical background of a light modulation device of the present invention for use in the field of optical communication art is described below.

In the field of optical communication art, optical switching devices are used for on-off of optical signals transmitted on the optical transmission line such as an optical fiber or a thin film optical waveguide, or used for a change of the optical transmission direction.

Conventionally used in the field of optical communication art is a mechanical optical switching system, for example, a system wherein an optical fiber is mechanically moved to change its connecting portion to other optical fiber or a system wherein an optical member such as a prism, a mirror or a lens is moved to change the light path.

In the mechanical optical switching system, however, the switching time is slow, e.g., several msec (millisecond), and moreover there is involved a problem of wearing properties in the driving part, and hence the switching device is deteriorated in the reliability.

On that account, a non-mechanical optical switching system wherein the optical path is changed by utilizing electrooptic (EO) effect, acoustooptic (AO) effect, magnetooptic (MO) effect, etc. has been recently proposed in place of the above-mentioned mechanical optical switching system.

As the non-mechanical optical switching system, there can be mentioned, for example, an optical switching system utilizing the EO effect of a nematic liquid crystal material as described in R. E. Wagner & J. Cheng, "Applied Physics", Vol. 19, 2921 (1980).

In FIGS. 16a and 16b, a liquid crystal optical switching device (1') proposed by R. E. Wagner is shown, and the optical switching device of FIG. 16a and the optical switching device of FIG. 16b are different from each other in the output direction of a light (2).

In the liquid crystal optical switching device (1'), both of a polarization beam splitter (31, 31) and a total reflection mirror (3, 3) are arranged before and behind a liquid crystal cell (11'), and the liquid crystal cell (11') is connected with a voltage signal input means which is not shown in FIGS. 16a and 16b.

In the liquid crystal cell (11'), a nematic liquid crystal material is contained. When a voltage is not applied to the liquid crystal cell (11'), the polarization direction of the light (2) transmitted through the liquid crystal cell (11') is made to be changed by 90°.

In the optical switching device (1') shown in FIGS. 16a and 16b, the incident light released from a laser or the like is split into a vertically polarized light (↕) and a horizontally polarized light (*) by means of a polarization beam splitter (31) positioned on the light incidence side. Then, the the horizontally polarized light (*) is reflected by the total reflection mirror (3) on the light incidence side at right angles and transmitted by the liquid crystal cell (11'). On the other hand, the vertically polarized light (↕) is transmitted by the liquid crystal cell and then reflected by the total reflection mirror (3) on the light outgoing side at right angles.

As shown in FIG. 16a, when an electric field is not applied to the liquid crystal cell (11'), each of the horizontally polarized light component (*) and the vertically polarized light component (↕) of the incident light transmitted through the liquid crystal cell (11') is rotated by 90° with respect to the polarization plane in accordance with twist of the orientation of the liquid crystal molecules, and the vertically polarized light component (↕) and the horizontally polarized light component (*) are together released as output A (output intensity IA) from the polarization beam splitter (31) on the light outgoing side. When an electric field is applied to the liquid crystal cell (11'), the nematic liquid crystal molecules are orientated in the vertical direction against the substrate, and the polarized light of the incident light is transmitted through the liquid crystal cell (11') without any change. The transmitted light is released as output B (output intensity IB) from the polarization beam splitter (31) on the light outgoing side.

In the optical switching device (1'), as described above, the polarization plane of the light transmitted through the liquid crystal cell (11') in the case where a voltage is not applied to the liquid crystal cell (11') differs by 90° from that in the case where a voltage is applied to the liquid crystal cell (11') so as to change the orientation of the direction of the nematic liquid crystal molecules. Utilizing this difference in the polarization plane of the light transmitted through the liquid crystal cell, change of the light path, namely, optical switching, is carried out.

In the above optical switching, when a voltage is applied to the liquid crystal cell (11') so as to change the orientation of the direction of the nematic liquid crystal molecules contained in the liquid crystal cell (11'), it is preferable that a light having the same intensity as the light beam (2), is released from the polarization beam splitter (31) on the light outgoing side in the direction of the above-mentioned output B, but practically, leak of a light takes place in the direction of the output A.

Also when a voltage is not applied to the liquid crystal cell (11'), leak of a light takes place in the direction of the output B from the polarization beam splitter (31) on the exit side. As a result, a light having a light intensity IA is released in the direction of the output A and a light having a light intensity IB is released in the direction of the output B from the polarization beam splitter (31) on the light exit side.

A crosstalk value (CR), which indicates optical switching performance, can be represented by the following formula using the output light intensities IA(off) and IB(off) given when a voltage is not applied to the liquid crystal cell.

$$CR = 10 \times \log_{10} [IB(\text{off})/IA(\text{off})] \tag{1}$$

In the conventionally used mechanical optical switching system to change the light path, the switching time is several msec or more. Further, because of its mechanical system, there is involved a problem of wearing properties in the driving part, and this causes deterioration of the reliability required for an optical switching device. On the other hand, the optical switching device using the electrooptic effect of the above-mentioned nematic liquid crystal material works depending on with or without applying a voltage to the nematic liquid crystal material, and it is not driven mechanically. Hence, the optical switching device of this type lasts long. However, the liquid crystal switching device (1') has a problem of long (slow) switching time, e.g., several msec, because the liquid crystal material layer in the liquid crystal cell (11') is composed of a nematic liquid crystal material.

The optical switching device used for changing the light path in the field of optical communication art is described above. Also in the nematic liquid crystal optical switching element used for on-off of the optical signals transmitted on the optical transmission line by means of the open-close operation of the light path, there is involved a problem that the switching time is several msec or more (slow).

Accordingly, an optical switching device capable of realizing a high-speed change of a light path and a high-speed open-close (on-off) operation of a light path has been now eagerly desired.

Next, the technical background of an optical shutter of the invention for use in the field of stereoscopic image display art is described below.

Conventionally used in the field of stereoscopic image display art is a stereoscopic image display method in which images for being observed by each of right and left eyes are formed on an image display screen such as a CRT or a liquid crystal display panel by means of scanning, and then are changed alternately based on each scanning field simultaneously with optical shuttering, and the open-close (on-off) operation of the optical shutter is carried out synchronously with the change of the image so that the stereoscopic image can be observed with time sharing.

As the system for allowing the observer to observe the stereoscopic image with time sharing as mentioned above, there can be used the following two systems.

(a) A system wherein optical shutters, such as spectacles using optical shutters in place of lenses, are positioned between eyes of the observer and the image display screen.

(b) A system wherein an optical shutter for alternately changing the polarization direction of the transmitted light is positioned between the image display screen and the observer so that the image display screen can be observed by the observer through the optical shutter, and by the operation of the optical shutter, the image display screen can be observed with the horizontally polarized light and the vertically polarized light alternately, and spectacles using in place of lenses polarization plates which transmit lights different in the polarization direction, e.g., a horizontally polarized light and a vertically polarized light, are fitted.

Examples of the optical shutters employable for the stereoscopic image display method include a mechanical optical shutter and a non-mechanical optical shutter. They are appropriately used in accordance with the above-described observation system, but an optical shutter utilizing a liquid crystal cell using a nematic liquid crystal material has been paid much attention because it can be used for both the above systems (a) and (b), and can be driven at a low voltage and a low electric power.

In the display of the stereoscopic image, however, the images observed by the right and left each eyes are required to be changed at an interval of not more than about 30 msec, and in order to conduct the open-close (on-off) operation of the optical shutter synchronously with the change of the image, the response time of the optical shutter must be made not more than about 1 msec.

Moreover, the angle range in which the displayed image can be well seen (hereinafter referred to as "angle of visibility") is desired to be wide similarly to the CRT in order to obtain a stereoscopic image of high quality.

In the above-mentioned viewpoints, the optical shutter using a liquid crystal cell having the nematic liquid crystal material layer has various problems, for example, the response time for the open-close (on-off) operation of the optical shutter, namely, open-close (on-off) operation of the light path, is long, e.g., several msec; and when the response time is short, the contrast is reduced or the angle of visibility is narrowed.

As explained above, in the field of the optical communication art and the field of the stereoscopic image display art, accordingly, a light modulation device capable of realizing a high-speed change of a light path and a high-speed open-close (on-off) operation of a light path has been eagerly desired.

OBJECT OF THE INVENTION

It is, therefore, an object of the present invention to provide a liquid crystal light modulation device which has a wide angle of visibility and is capable of realizing a high-speed change of a light path and a high-speed on-off operation of optical signals transmitted on the light path by the use of a chiral smectic liquid crystal material, especially an antiferroelectric or ferroelectric liquid crystal material, and a liquid crystal light modulation device which has a wide angle of visibility and is capable of rotating the polarization plane of an incident light about 90° at high speed.

SUMMARY OF THE INVENTION

There is provided by the present invention a liquid crystal light modulation device comprising a liquid crystal element consisting of one or more liquid crystal cells and a voltage signal input means electrically connected with the liquid crystal element, wherein:

each of said liquid crystal cells has a pair of transparent substrates on each of which a transparent electrode and a transparent orientation control film are laminated in this order;

each of the transparent electrodes is electrically connected with the voltage signal input means so as to electrically connect the liquid crystal element with the voltage signal input means;

the orientation control films are apart from each other at a certain distance, between said orientation control films being sandwiched a chiral smectic liquid crystal material layer;

the liquid crystal element is such a liquid crystal element that the polarization direction of a light transmitted by the liquid crystal element is changed by approx. 90° when a given voltage signal is input to the liquid crystal element from the voltage signal input means.

If the chiral smectic liquid crystal material layer is an antiferroelectric liquid crystal material layer, this antiferroelectric liquid crystal material layer is preferably formed from liquid crystal molecules having a tilt angle of 21° to 24° or having a tilt angle of 42° to 48°.

If the chiral smectic liquid crystal material layer is a ferroelectric liquid crystal material layer, this ferroelectric liquid crystal material layer is preferably formed from liquid crystal molecules having a tilt angle of 21° to 24°.

Further, when a wavelength λ of an incident light on the liquid crystal element is not less than 0.8 μm, a thickness d of the chiral smectic liquid crystal material layer (if the liquid crystal element has plural chiral smectic liquid crystal material layers, d means the total thickness of those layers) is preferably in the range of 3 to 9 μm. When the wavelength λ is in the range of 0.4 to 0.7 μm, the thickness d is preferably in the range of 1.5 to 4 μm.

BRIEF DESCRIPTION OF THE DRAWING

FIG. 15 is a view showing a change of a transmitted light through the liquid crystal cell in the liquid crystal light modulation device of Example 5.

DETAILED DESCRIPTION OF THE INVENTION

The liquid crystal light modulation device of the invention is described in detail hereinafter with reference to the attached drawings.

Figure 1:
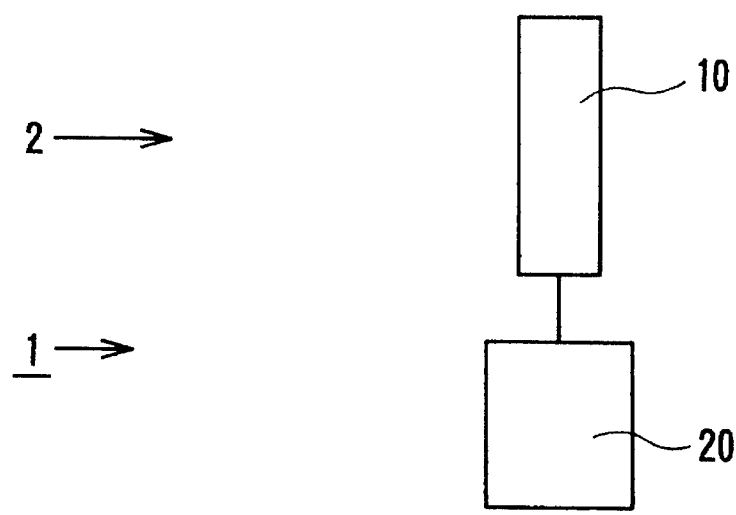
FIG. 1 is a schematic view showing a first embodiment of the liquid crystal light modulation device according to the present invention.

FIG. 1 schematically shows a first embodiment of the liquid crystal light modulation device according to the present invention.

This liquid crystal light modulation device (1) has a liquid crystal element (10) and a voltage signal input means (20) which is electrically connected with the liquid crystal element (10).

Figure 2:
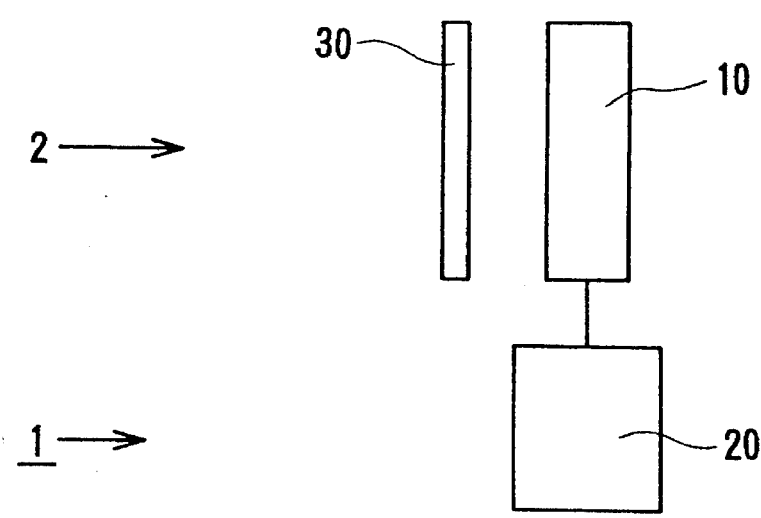
FIG. 2 is a schematic view showing a second embodiment of the liquid crystal light modulation device according to the present invention.

FIG. 2 schematically shows a second embodiment of the liquid crystal light modulation device according to the present invention. The liquid crystal light modulation device (1) has a liquid crystal element (10), a voltage signal input means (20) which is electrically connected with the liquid crystal element (10) and a polarization control means (30) placed in parallel with the liquid crystal element (10) on the side where a light (2) inputs into the liquid crystal element (10).

Figure 3:
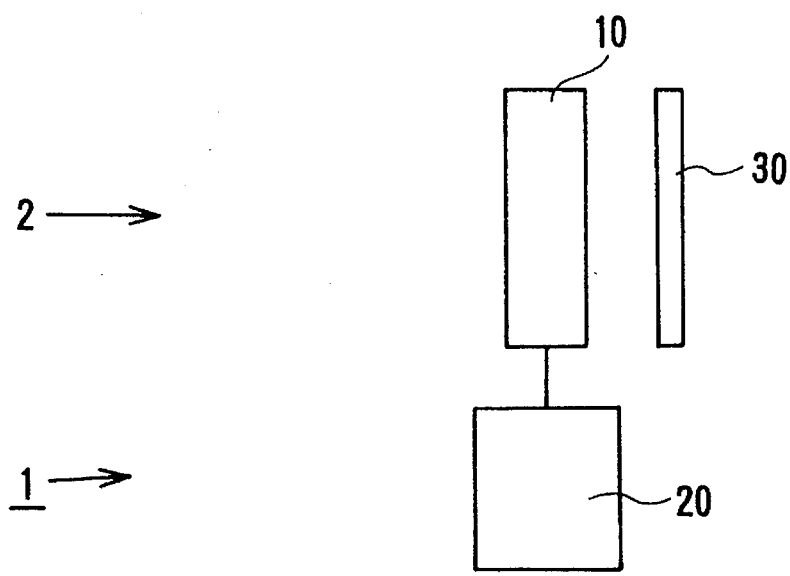
FIG. 3 is a schematic view showing a third embodiment of the liquid crystal light modulation device according to the present invention.

FIG. 3 schematically shows a third embodiment of the liquid crystal light modulation device according to the present invention. The liquid crystal light modulation device (1) has a liquid crystal element (10), a voltage signal input means (20) which is electrically connected with the liquid crystal element (10) and a polarization control means (30) placed in parallel with the liquid crystal element (10) on the light outgoing side of the liquid crystal element (10).

Figure 4:
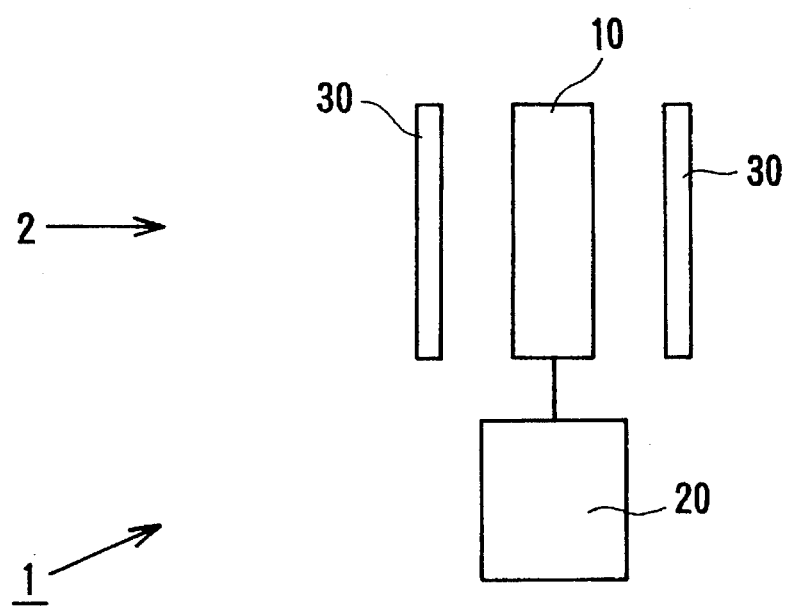
FIG. 4 is a schematic view showing a fourth embodiment of the liquid crystal light modulation device according to the present invention.

FIG. 4 schematically shows a fourth embodiment of the liquid crystal light modulation device according to the present invention. The liquid crystal light modulation device (1) has a liquid crystal element (10), a voltage signal input means (20) which is electrically connected with the liquid crystal element (10) and a polarization control means (30) placed in parallel with the liquid crystal element (10) on each of the side where a light (2) inputs into the liquid crystal element and the light outgoing side of the liquid crystal element (10).

As described above, the liquid crystal light modulation device (1) of the present invention includes the liquid crystal element (10), the voltage signal input means (20), and optionally the polarization control means (30) placed on at least one side of the light incidence side and the light outgoing side of the liquid crystal element (10).

Figure 5:
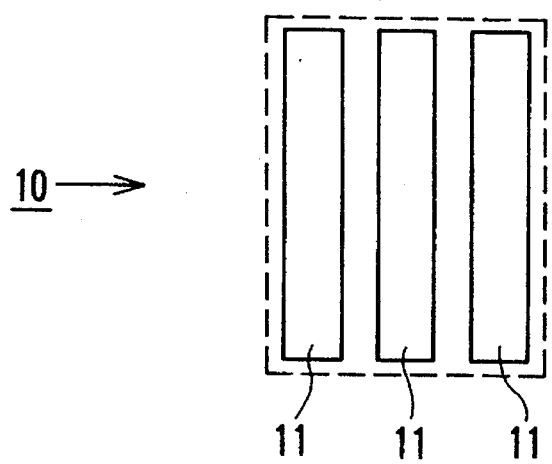
FIG. 5 is a schematic sectional view showing an example of a liquid crystal element used for the liquid crystal optical switching device according to the present invention.

In the liquid crystal light modulation device (1) of the present invention, the liquid crystal element (10) may consist of a single liquid crystal cell, or may consist of plural liquid crystal cells as shown in FIG. 5.

In FIG. 5, the liquid crystal element (10) of the liquid crystal light modulation device (1) shown in FIG. 1 consists of three liquid crystal cells (11), and the liquid crystal cells (11) are placed in parallel with each other in such a manner that a light is transmitted through these cells one after another. These liquid crystal cells (11, 11, 11) may be apart from each other, or may be connected to each other with a transparent adhesive material. On the surface of a substrate, which is not shown in FIG. 5, of each liquid crystal cell (11), a reflection protective film is preferably formed, and the above-mentioned adhesive material preferably has a refractive index almost equal to that of the substrate of the liquid crystal cell. If the reflection protective film is formed on the surface of the substrate, or if the refractive index of the adhesive material is almost equal to that of the substrate, light reflection on the surface of the substrate can be prevented, whereby loss of light quantity caused when the incident light to the liquid crystal element (10) is transmitted through each liquid crystal cell (11) is reduced.

Figure 6:
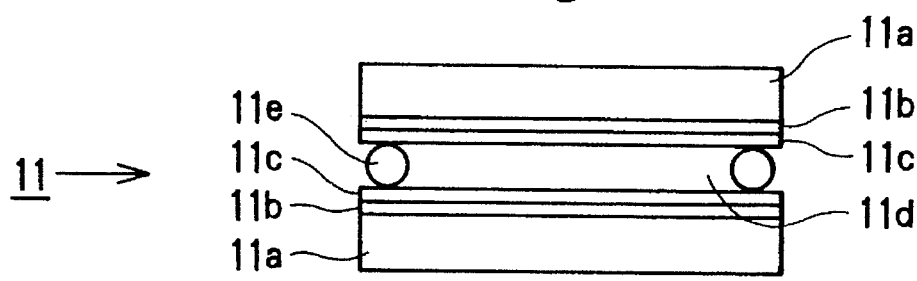
FIG. 6 is a schematic sectional view showing an example of a liquid crystal cell used for the liquid crystal light modulation device according to the present invention.

Each of the liquid crystal cells (11, 11, 11) has a pair of transparent substrates (11a, 11a) made of a glass, a resin, etc. as shown in FIG. 6. On each transparent substrate (11a), a transparent electrode (11b) and a transparent orientation control film (11c) are laminated toward inside of the liquid crystal cell (11) in this order.

The orientation control film (11c) is made of one film selected from resin films (e.g., a polyimide film) having been rubbed in a given direction, resin films having a great number of fine parallel grooves with a width of several hundreds to several thousands angstrom formed by, for example, etching, and inorganic films obtained by inclined deposition such as a SiO film and a $SiO_2$ film.

Between the orientation control films (11c, 11c), a chiral smectic liquid crystal material layer (11d) is sandwiched. The peripheral portions of the transparent substrates (11a, 11a) are bonded to each other using an adhesive material such as an epoxy resin by way of, for example, spacer particles (11e) in order to make the orientation control films apart from each other at a certain distance. Owing to the cured adhesive material, the liquid crystal cell (11) is sealed up containing therein the chiral smectic liquid crystal material layer (11d) having almost constant thickness.

Instead of the liquid crystal element (10) consisting of the plural liquid crystal cells (11, 11, 11) described above, a liquid crystal element (10) consisting of a single liquid crystal cell (11) can be employed as shown in FIG. 6.

Figure 7:
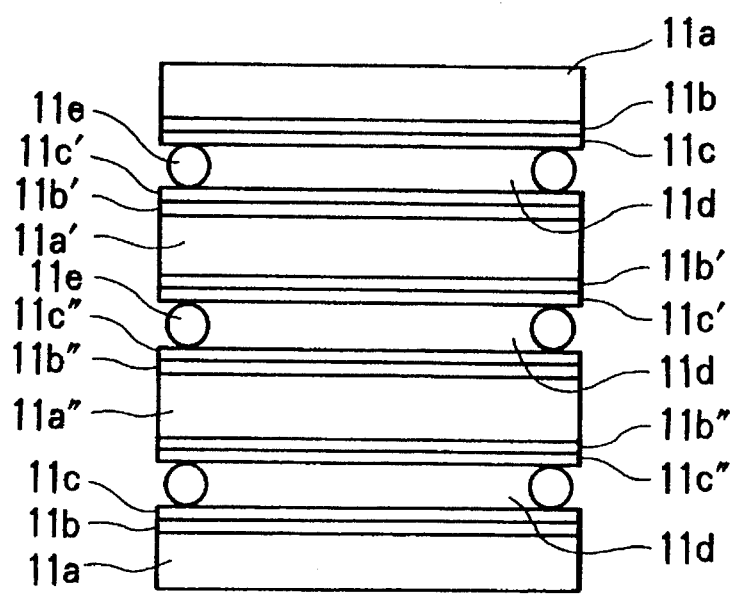
FIG. 7 is a schematic sectional view showing another example of a liquid crystal cell used for the liquid crystal light modulation device according to the present invention.

In the liquid crystal cell (11) shown in FIG. 7, two transparent substrates (11a', 11a'') are arranged apart from each other at a given distance between the orientation control films (11c, 11c) of the liquid crystal cell (11) shown in FIG. 6.

On both surfaces of the transparent substrate (11a'), a transparent electrode (11b', 11b') and a transparent orientation control film (11c', 11c') are laminated in this order. Likewise, on both surfaces of the transparent substrate (11a''), a transparent electrode (11b', 11b') and a transparent orientation control film (11c'', 11c'') are laminated in this order.

Further, a certain distance is given between the orientation control films (11c, 11c'), between the orientation control films (11c', 11c'') and between the orientation control films (11c'', 11c) by, for example, spacer particles (1e), as in the liquid crystal element (11) shown in FIG. 6, and a chiral smectic liquid crystal material layer (11d) is sandwiched between the orientation control films (11c, 11c'), between the orientation control films (11c', 11c'') and between the orientation control films (11c'', 11c).

Similarly to the liquid crystal cell (11) shown in FIG. 6, the peripheral portions of the transparent substrates (11a, 11a) of the liquid crystal cell (11) are bonded to each other using an adhesive material, such as an epoxy resin, which contains, for example, spacer particles (11e). Owing to the cured adhesive material, the liquid crystal cell (11) is sealed up containing therein the chiral smectic liquid crystal material layer (11d) having almost constant thickness.

Figure 8:
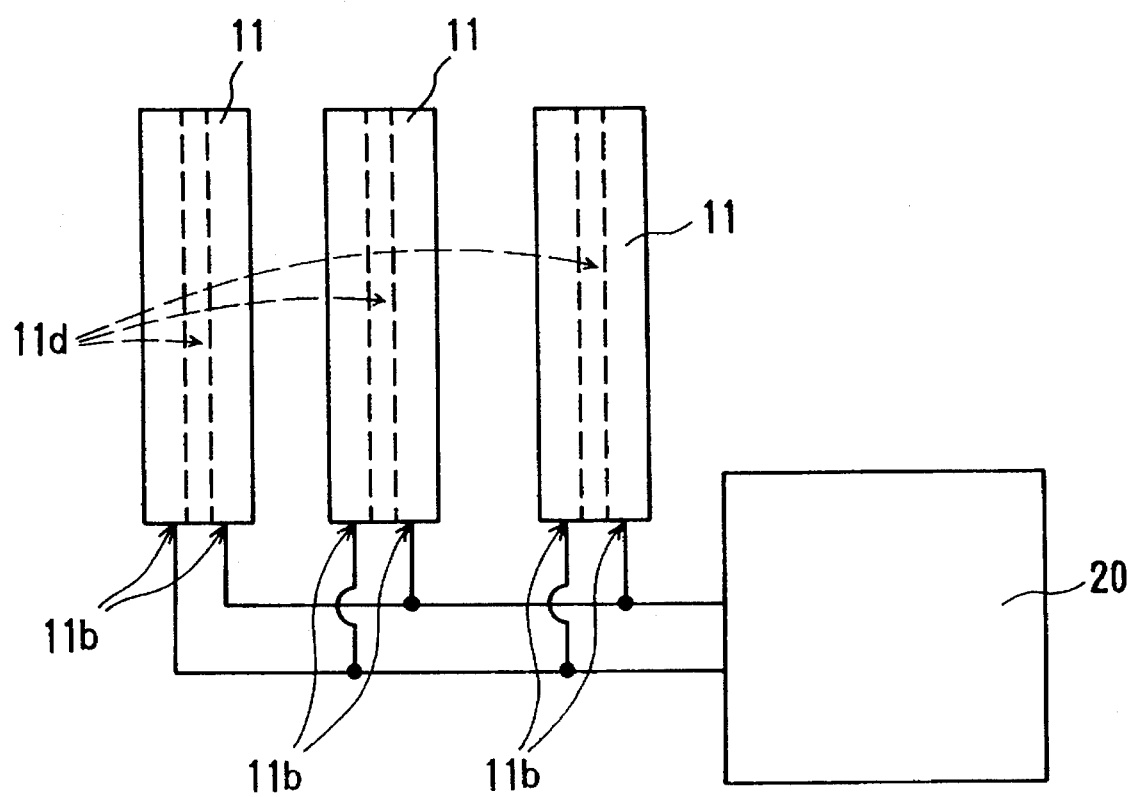
FIG. 8 is a view to illustrate electrical connection between a liquid crystal element and a voltage signal input means in the liquid crystal light modulation device according to the present invention.

In FIG. 8, the liquid crystal element (10) is electrically connected with the voltage signal input means (20) so that the same voltage signal can be input to each pairs of the transparent electrodes (11b, 11b) arranged on both sides of the plural chiral smectic liquid crystal material layers (11d).

The liquid crystal element (10) electrically connected with the voltage signal input means (20), namely, the liquid crystal element (10) which consists of the plural liquid crystal cells (11) as shown in FIG. 5 or consists of the liquid crystal cell (11) as shown in FIG. 7, is advantageously used in the following case.

If the thickness of the chiral smectic liquid crystal material layer (11d) is not less than 3 μm, the orientation control force of the orientation control film (11c), (11c') or (11c'') does not come up to the inside of the chiral smectic liquid crystal material layer (11d), and thereby the orientation of liquid crystal molecules in the chiral smectic liquid crystal material layer becomes insufficient.

When the liquid crystal material layer contained in the liquid crystal element (10) is deteriorated in the orientation, leak of a light on the light output side of the liquid crystal light modulation device (1) becomes large, and thereby satisfactory optical shuttering cannot be made by the liquid crystal light modulation device (1).

Especially in the case of the optical switching of a semiconductor laser beam having a wavelength of not shorter than 0.8 μm which is generally used in the field of optical communication art, the thickness of the chiral smectic liquid crystal material layer (11d) is desirable to be in the range of 3 to 9 μm as described later.

The liquid crystal element (10) which consists of the plural liquid crystal cells (11) as shown in FIG. 5 or consists of the liquid crystal cell (11) as shown in FIG. 7 contains therein plural chiral smectic liquid crystal material layers (11d), and hence if the thickness of each liquid crystal material layer is set in the range of 1 to 3 μm, the total thickness of those layers can be set in the desired range of 3 to 9 μm. Accordingly, the orientation of the chiral smectic liquid crystal material layers (11d) contained in the liquid crystal element (10) can be sufficiently enhanced, whereby an excellent liquid crystal light modulation device (1) capable of realizing satisfactory optical shuttering can be obtained.

Though there is a problem of difficult control of the orientation in the chiral smectic liquid crystal material layer (11d) in the case when the thickness of the chiral smectic liquid crystal material layer (11d) is not less than 3 μm, this problem can be solved by placing plural of, for example, 2 to 4 chiral smectic liquid crystal material layers (11d) in parallel inside the liquid crystal element (10).

If the problem on the orientation of the chiral smectic liquid crystal material layer (11d) is solved, the liquid crystal light modulation device (1) of the present invention utilizing the electrooptic effect of the chiral smectic liquid crystal material layer (11d), especially an antiferroelectric or ferroelectric liquid crystal material layer becomes very advantageous, because the optical switching time can be shortened to about 1/1000 as much as the optical switching time given when the conventional nematic liquid crystal light modulation device is used.

The chiral smectic liquid crystal material layer (11d) used for the liquid crystal cell (11) of the liquid crystal light modulation device according to the present invention may be either a ferroelectric liquid crystal material layer or an antiferroelectric liquid crystal material layer. However, preferred is the antiferroelectric liquid crystal material layer, because uniform orientation of liquid crystal molecules can be easily obtained and the orientation can be hardly disturbed even by an impact from the outside of the liquid crystal cell (11), and can obtain a high contrast.

Figure 9A:
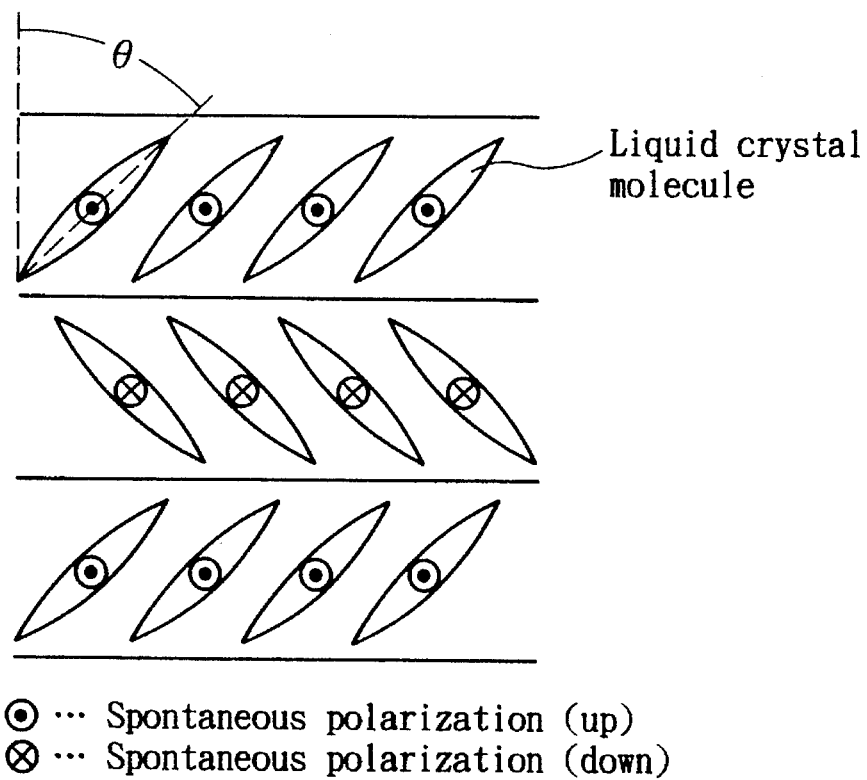
FIG. 9a is a schematic view showing an orientation state of antiferroelectric liquid crystal molecules.
Figure 9B:
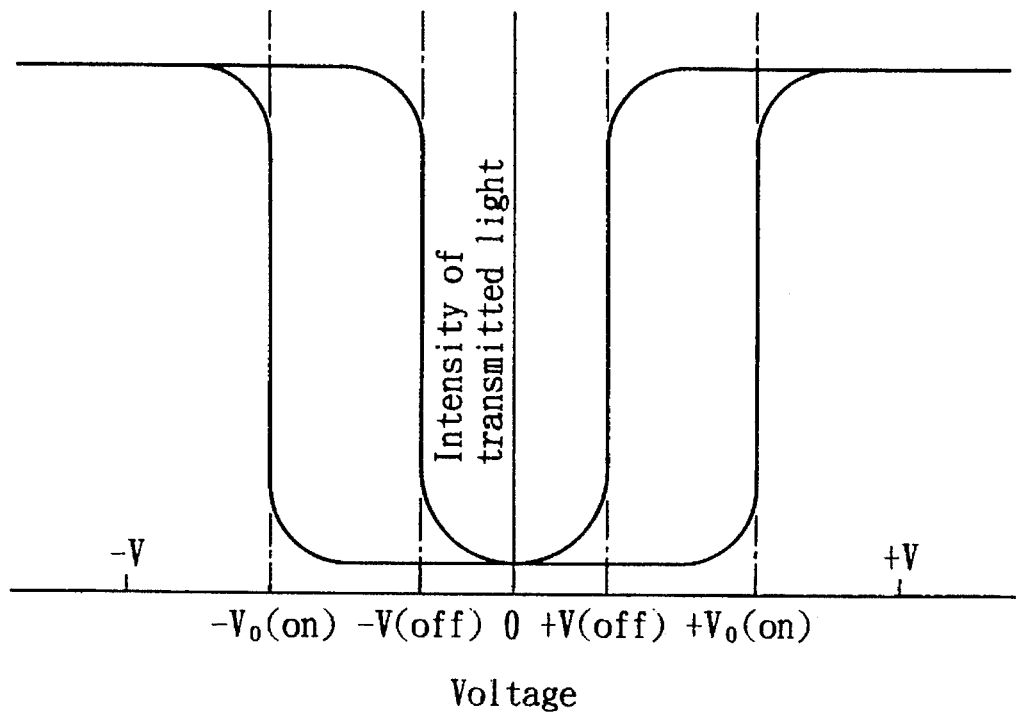
FIG. 9b is a view to illustrate electrooptic properties of an antiferroelectric liquid crystal material layer used for the liquid crystal light modulation device according to the present invention.

The antiferroelectric liquid crystal is described in detail, for example, in Chandani, et al., "Jpn. J. Appl. Phys." 28, L1261, 1989. In the antiferroelectric liquid crystal, as shown in FIG. 9a, when an electric voltage is not applied to the liquid crystal, the directions of the spontaneous polarizations in one molecular layer are opposite to those in the adjacent molecular layer of the smectic liquid crystal, that is, the liquid crystal is in the antiferroelectric state. When a voltage is applied, a strong interaction is exerted between the applied electric field (E) and the spontaneous polarization, whereby the spontaneous polarization is orientated in the direction of the electric field at a high speed. Such antiferroelectric liquid crystal generally has a torque from the electric field of about 1,000 times as much as the torque of the nematic liquid crystal, and hence the response time can be drastically shortened to about 1/1,000. FIG. 9b shows a relationship between the transmitted light amount and the voltage (triangular wave) of a typical antiferroelectric liquid crystal material.

The present invention uses such a liquid crystal element (10) using chiral smectic liquid crystal material, especially an antiferroelectric or ferroelectric liquid crystal material that if a given voltage signal is input by the voltage signal input means (20), the polarization direction of a light (3) is changed by approx. 90° while the light (3) is transmitted through the liquid crystal element (10).

Such liquid crystal element (10) can be obtained, for example, in the following manner.

First, the liquid crystal element (10) which consists of a single liquid crystal cell (11) as shown in FIG. 6 and contains an antiferroelectric liquid crystal material layer as the chiral smectic liquid crystal material layer (11d) in the liquid crystal cell (11) is described below.

When a voltage of not less than $+V_0$(on) volt shown as a given voltage in FIG. 9b, namely, +V volt, is applied between the transparent electrodes (11b, 11b), the liquid crystal molecules forming the antiferroelectric liquid crystal material layer (11d) in the liquid crystal cell (11) are tilted by an angle θ of a gradient of a liquid crystal molecule to the normal line against the plane of the smectic liquid crystal material layer (hereafter, it is merely called "a tilt angle θ") so as to change the polarization properties of the antiferroelectric liquid crystal material layer (11d), as compared with the case where the voltage applied between the transparent electrodes (11b, 11b) is in the range of 0 to $+V_0$ (off) volt. As a result, differently from the case of using the nematic liquid crystal material, the incident light is transmitted by the liquid crystal cell (11) while it is variously changed in its polarization state, for example, into an elliptically polarized light, a circularly polarized light and a linearly polarized light.

The polarization state of the light transmitted through the liquid crystal cell having the antiferroelectric liquid crystal material layer (11d) was theoretically analyzed, and as a result, it has been found that the light transmitted through the liquid crystal cell (11) becomes linearly polarized light, the direction of the polarized light is at right angles to the direction of the incident light, and the polarization plane is rotated by 90°, when the chiral smectic liquid crystal satisfies the following two formulas (2) and (3) at the same time.

$$(ne-no) \cdot d/\lambda = \tfrac{1}{2} \qquad (2)$$

$$\tan^2(\Omega) = ne(no+ng)^2/(no(ne+ng)^2) \qquad (3)$$

wherein ne is a refractive index of a chiral smectic liquid crystal material layer (including an antiferroelectric liquid crystal material layer) to extraordinary rays, no is a refractive index of the same layer to ordinary rays, ng is a refractive index of a glass substrate, d is a thickness of a chiral smectic liquid crystal material layer (including an antiferroelectric liquid crystal material layer); Ω represents a gradient angle of a liquid crystal molecule resulted from applying a voltage to a liquid crystal cell, which is equal to the tilt angle θ at the time when a voltage is applied to the liquid crystal cell containing the above-mentioned antiferroelectric layer, and λ is a wavelength of a light incident upon a liquid crystal cell.

In the field of optical communication art, a laser diode or semiconductor laser which releases a light having a wavelength of 0.8 μm or more, especially of 1.31 μm or 1.55 μm has been recently used as a light source. In order to change the polarization direction of the incident light having a wavelength of not less than 0.8 μm by approx. 90° C. by means of the liquid crystal light modulation device (1) of the invention, the thickness of the antiferroelectric liquid crystal material layer (11d) is preferably in the range of 3 to 9 μm from the above formula (2), and the tilt angle θ preferably satisfies the following formula (4) derived from the above formula (3).

$$42° \leq \theta > 48° \qquad (4)$$

In the field of stereoscopic image display art, light modulation of a visible light (0.4 to 0.7 μm) is required to be carried out. When the light having a wavelength of 0.4 to 0.7 μm is modulated by means of the liquid crystal light modulation device (1) of the present invention, the thickness of the antiferroelectric liquid crystal material layer (11d) is preferably in the range of 1.5 to 4 μm from the above-mentioned formula (2).

In the case where the liquid crystal element (10) consists of plural liquid crystal cells (11) as in the liquid crystal element (10) shown in FIG. 5, or in the case where the liquid crystal element (10) consists of a single liquid crystal cell (11) having plural antiferroelectric liquid crystal material layers (11d) as in the liquid crystal cell (11) shown in FIG. 7, the thickness of each antiferroelectric liquid crystal material layer (11d) is desirable to be appropriately adjusted so that the total thickness of the plural antiferroelectric liquid crystal material layers (11d) contained in the liquid crystal element (10) becomes a value obtained from the above formula (2).

Then, a voltage of not less than the threshold positive value $+V_0$(on) volt shown as a given voltage in FIG. 9b, namely, +V volt, is applied between the transparent electrodes (11b, 11b), and then a voltage of not more than $-V_0$(on) volt, namely, -V volt, is applied between the transparent electrodes (11b, 11b), so as to change the polarization direction of the light (3) passing through the liquid crystal element (10) by approx. 90°.

When a voltage applied between the transparent electrodes (11b, 11b) is changed from 0 to less than +Vo (on) volt to +V volt, the liquid crystal molecules constituting the antiferroelectric liquid crystal material layer (11d) in the liquid crystal cell (11) are tilted by a tilt angle θ. Therefore, if the voltage applied between the transparent electrodes (11b, 11b) is changed from +V volt to -V volt, the gradient Ω of long axial direction of liquid crystal molecules is changed by 2θ.

Accordingly, the tilt angle θ required to change the polarization direction of the light (2) passing through the liquid crystal element (10) by approx. 90° becomes half value shown by the above formula (4) and, accordingly, the tilt angle θ is represented by the following formula (5).

$$21° \leq \theta \leq 24° \tag{5}$$

The antiferroelectric liquid crystal material layer (11d) has a thickness represented by the formula (2) as in the above-mentioned case.

Accordingly, also in the case of changing the polarization direction of the light (2) passing through the liquid crystal element (10) by approx. 90°, the aforementioned thickness is preferred. That is, when a light having a wavelength of 0.8 μm or more is modulated by means of the liquid crystal light modulation device (1) of the invention, the thickness of the antiferroelectric liquid crystal material layer (11d) is preferably in the range of 3 to 9 μm, and when a light having a wavelength of 0.4 to 0.7 μm is modulated by means of the liquid crystal light modulation device (1) of the present invention, the thickness of the antiferroelectric liquid crystal material layer (11d) is preferably in the range of 1.5 to 4 μm.

By setting the thickness of the antiferroelectric liquid crystal material layer (11d) in such a manner that the liquid crystal satisfies both the above formulae (2) and (3), which are conditions for rotating the polarization plane of the light transmitted through the liquid crystal by 90°, and by using an antiferroelectric liquid crystal having a tilt angle given by the above formula (4) or (5), as described above, a liquid crystal light modulation device having a small crosstalk value can be obtained by virtue of quick response of the antiferroelectric liquid crystal.

In the present invention, a liquid crystal modulation device using a ferroelectric liquid crystal material can be also prepared in a manner similar to that for the antiferroelectric liquid crystal light modulation device.

Figure 10A:
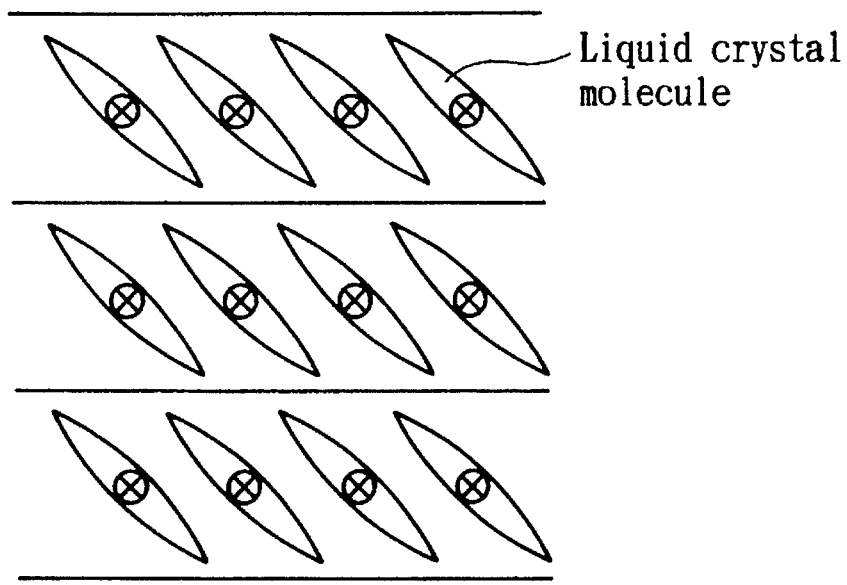
FIG. 10a is a schematic view showing an orientation state of ferroelectric liquid crystal molecules.
Figure 10B:
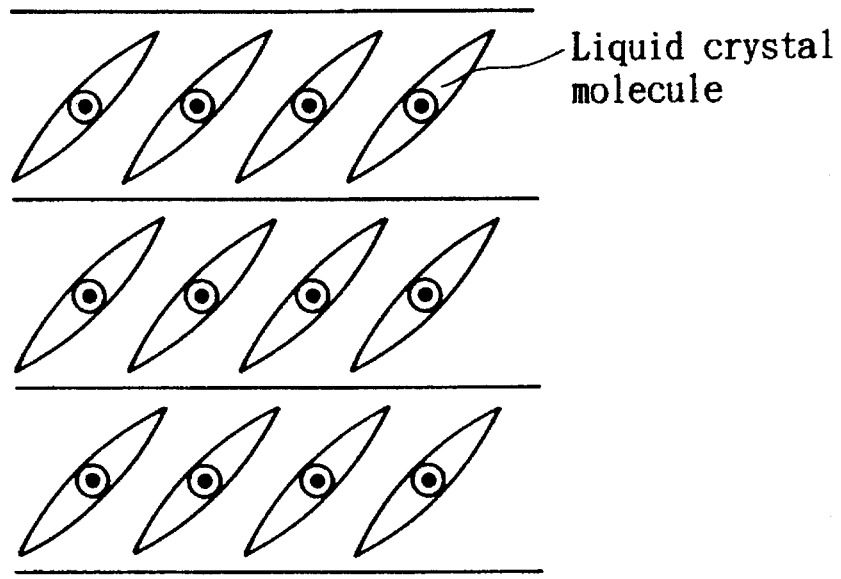
FIG. 10b is a schematic view showing another orientation state of ferroelectric liquid crystal molecules.

The ferroelectric liquid crystal material is described in detail, for example, in Japanese Patent Publication No. 22287/1988. In the ferroelectric liquid crystal, as shown in FIG. 10a and FIG. 10b, the directions of the spontaneous polarization in each of smectic liquid crystal molecular layers are the same as each other, that is, the liquid crystal material is in the ferroelectric state.

When a voltage is applied, a strong interaction is exerted between the applied electric field (E) and the spontaneous polarization, whereby the spontaneous polarization is orientated in the direction of the electric field at a high speed, and this state is kept even after the application of the electric field is stopped. Accordingly, the ferroelectric liquid crystal has two stable states in accordance with the direction of the applied electric field.

Similarly to the antiferroelectric liquid crystal, the ferroelectric liquid crystal has a function of rotating the polarization plane of the incident light by 90°. An orientation control film is beforehand formed by the aforesaid method in such a manner that the direction of the liquid crystal optical axis (major axis direction of a molecule in one stable state) is parallel with the polarization direction of the incident light when the voltage applied to the liquid crystal is off, whereby the ferroelectric liquid crystal is orientated. When no voltage is applied to the thus orientated ferroelectric liquid crystal, the incident light is transmitted through the liquid crystal cell without any change in the polarization state. On the other hand, when a voltage of appropriate polarity is applied, the liquid crystal molecule is tilted by 2θ. Accordingly, the incident light is transmitted through the liquid crystal cell (11) while it is variously changed in its polarization state, for example, into an elliptically polarized light, a circularly polarized light and a linearly polarized light.

The polarization state of the transmitted light in the liquid crystal cell is described below in detail with reference to the ferroelectric liquid crystal. The conditions under which the light transmitted through the liquid crystal cell becomes a linearly polarized light, the direction of the polarized light is at right angles to the direction of the incident light, and the polarization plane is rotated by 90° are attained when the ferroelectric liquid crystal satisfies the above formulas (2) and (5) at the same time.

In the liquid crystal light modulation device (1) of the invention, the polarization control means (30) may be optionally placed on at least one side of the light incidence side and the light outgoing side of the liquid crystal element (10), if necessary.

As the light incidence side polarization control means (30), a polarization control means which changes a light incident upon the liquid crystal element (10) into a specific linear polarized light is used, and examples thereof include a polarization beam splitter and a linear polarizing plate. The polarization beam splitter is a polarization control means which releases a polarized incident light having a given polarization direction along its light path and releases a polarized incident light having a polarization direction meeting the above polarized incident light at right angles in the direction meeting its light path at right angles.

As the light outgoing side polarization control means (30), the following polarization control means are used in accordance with the purpose and the use of the liquid crystal light modulation device (1).

(a) A polarization control means which changes the path of the output light, for example, to a light path having the same direction with that of the incident light path to the liquid crystal element or to a light path having the direction at right angle to the incident light path to the liquid crystal element, in accordance with whether the polarization direction of the polarized light released from the liquid crystal element (10) is changed by approx. 90° or not; e.g., a polarization beam splitter.

(b) A polarization control means which shuts one polarized light and transmits the other polarized light, in accordance with whether the polarization direction of the polarized light released from the liquid crystal element (10) is changed by approx. 90° or not; e.g., a linear polarizing plate.

(c) A polarization control means which changes one polarized light into a circularly polarized light of right-handed rotatory and changes the other polarized light into a circularly polarized light of left-handed rotatory, in accordance with whether the polarization direction of the polarized light released from the liquid crystal element (10) is changed by approx. 90° or not; e.g., a ¼ wave plate.

If the circularly polarized light of right-handed rotatory or left-handed rotatory is selectively output from the liquid crystal light modulation device (1) by the use of the ¼ wave plate, the ¼ wave plate is set in such a manner that the optical axis is rotated by +45° or –45° around the axis which indicates a light proceeding direction upon the liquid crystal element. (In FIG. 13, the optical axis is, for convenience, shown to be tilted by 45° against the polarization plane upon the liquid crystal element.)

In the present invention, a high speed change of a light path or a high speed on-off operation of optical signals transmitted on the light path can be carried out by the use of the above-mentioned polarization control means singly or in combination, without narrowing the angle of visibility.

Figure 11A:
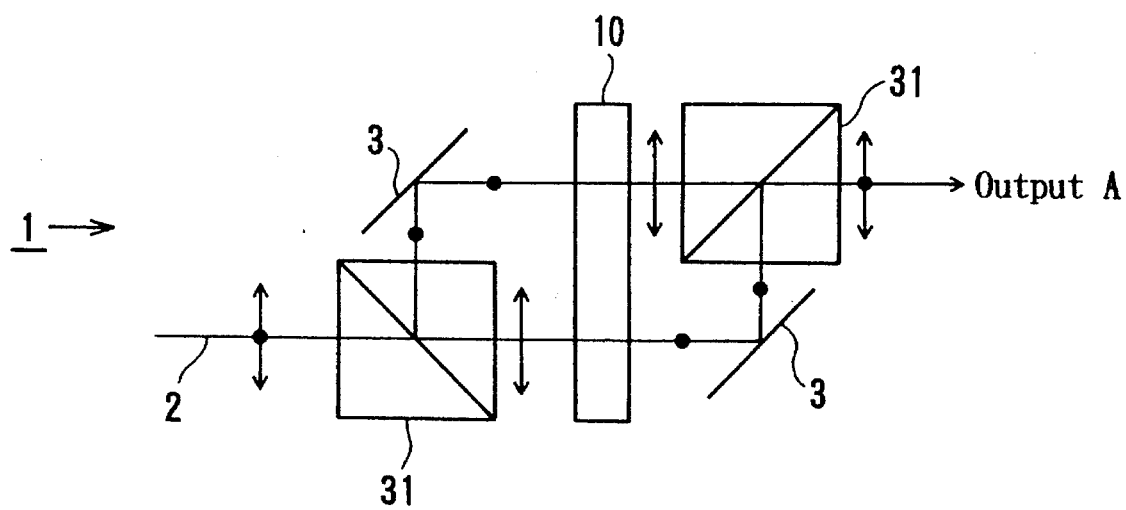
FIG. 11a is a view schematically showing optical switching performance given when a voltage signal is not input to a liquid crystal element of the liquid crystal light modulation device according to the present invention shown in FIG. 4.
Figure 11B:
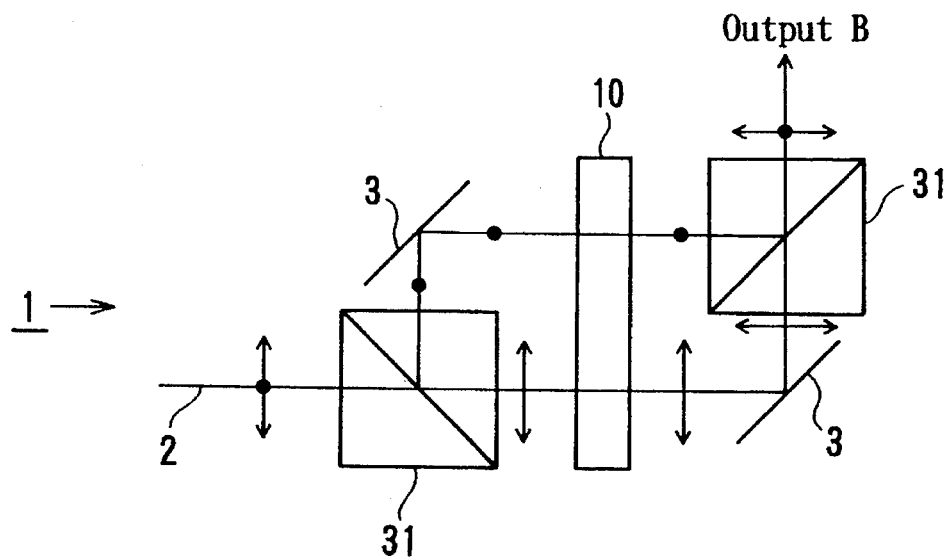
FIG. 11b is a view schematically showing optical switching performance given when a voltage signal is input to a liquid crystal element of the liquid crystal light modulation device according to the present invention shown in FIG. 4.
Figure 16A:
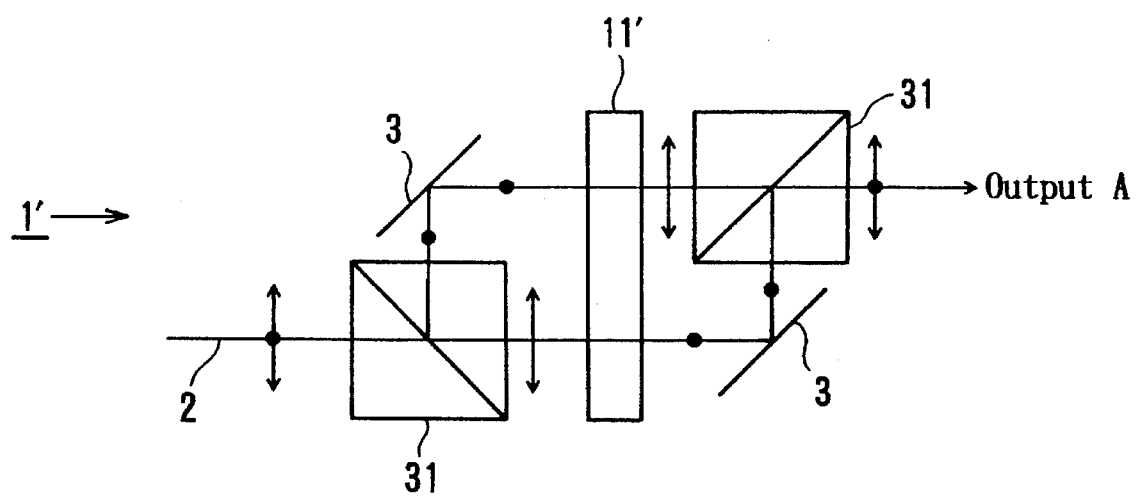
FIG. 16a is a view schematically showing optical switching performance given when a voltage signal is not input to a liquid crystal element of the conventional liquid crystal optical switching device.
Figure 16B:
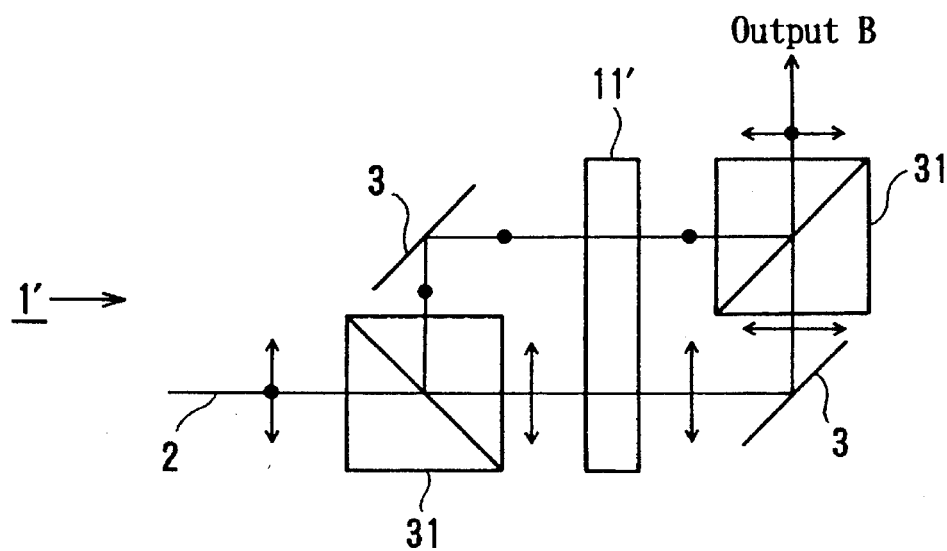
FIG. 16b is a view schematically showing optical switching performance given when a voltage signal is input to a liquid crystal element of the conventional liquid crystal optical switching device.

For example, when the nematic liquid crystal element (10') of the conventional liquid crystal optical switching device (1') shown in FIGS. 16a and 16b is replaced with the liquid crystal light modulation device (1) using a chiral smectic liquid crystal material, especially an antiferroelectric or ferroelectric liquid crystal material, as shown in FIG. 11a and FIG. 11b, the crosstalk value is smaller as compared with the nematic liquid crystal optical switching device (1'), and the same change of a light path as in the nematic liquid crystal optical switching device (1') can be carried out at a high speed of not more than 1 msec.

The liquid crystal light modulation device (1) shown in FIG. 11a and FIG. 11b is one example of the fourth embodiment of the liquid crystal light modulation device of the present invention shown in FIG. 4.

Figure 12A:
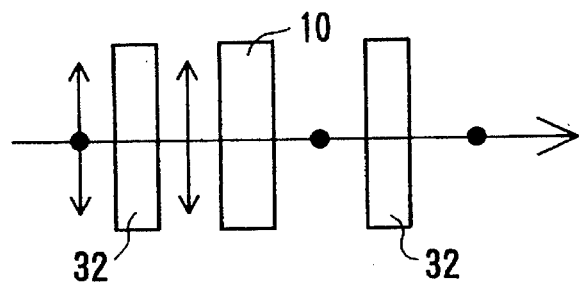
FIG. 12a is a view schematically showing optical switching performance given when a voltage signal is not input to a Liquid crystal element of the liquid crystal optical light modulation according to the present invention shown in FIG. 3.
Figure 12B:
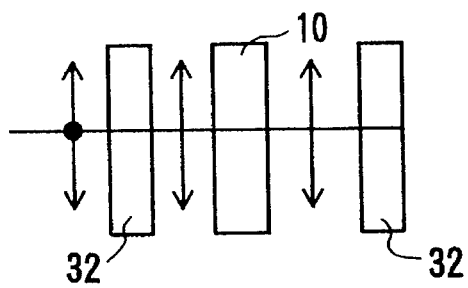
FIG. 12b is a view schematically showing optical switching performance given when a voltage signal is input to a liquid crystal element of the liquid crystal light modulation device according to the present invention shown in FIG. 3.

In FIG. 12a and FIG. 12b, two linear polarizing plates (32, 32) are placed on the light incidence side and the light outgoing side of the liquid crystal element (10) in such a manner that the polarization directions thereof meet at right angles, whereby it becomes possible that a horizontally polarized light (*) is output when a voltage signal is input to the liquid crystal element (10) as shown in FIG. 12a, and no light is output when a voltage signal is not input to the liquid crystal element (10) as shown in FIG. 12b.

As shown in FIG. 12a, the light (2) containing a horizontally polarized light (*) and a vertically polarized light ($\updownarrow$) is changed into only a vertically polarized light ($\updownarrow$) by means of the linear polarizing plate (32) on the light incidence side of the liquid crystal element (10), then this vertically polarized light ($\updownarrow$) is changed into a horizontally polarized light (*) when transmitted through the liquid crystal element (10), and this horizontally polarized light (*) is output through the outgoing side linear polarizing plate (32).

As shown in FIG. 12b, a vertically polarized light ($\updownarrow$) is incident on the liquid crystal element (10) as in FIG. 12(a), this vertically polarized light ($\updownarrow$) is transmitted through the liquid crystal element (10) without being changed into a horizontally polarized light (*), and the vertically polarized light ($\updownarrow$) is shut by the outgoing side linear polarizing plate (32).

A stereoscopic image free from a flicker can be observed in the following manner. The incidence side linear polarizing plate (32), the liquid crystal element (10) and the voltage signal input means (20) are used to construct the liquid crystal light modulation device (1) shown in FIG. 2. The liquid crystal light modulation device (1) is placed in front of a display screen in such a manner that the display screen can be seen by the observer through the liquid crystal element (10), images for being observed by each of right and left eyes are displayed on the display screen alternatively with time sharing, and open-close (on-off) operation of the light modulation device (1) is carried out synchronistically with the images. Further, a lens whose polarization direction meets the polarization direction of the entrance side linear polarizing plate at right angles is fitted on the right eye of the observer, and a lens whose polarization direction is parallel with the polarization direction of the entrance side linear polarizing plate is fitted on the left eye of the observer. When the displayed image are observed in the above manner, the observer can observe a stereoscopic image free from a flicker.

The liquid crystal light modulation device (1) mentioned above is one example of the second embodiment of the liquid crystal light modulation device of the present invention shown in FIG. 2.

Figure 13A:
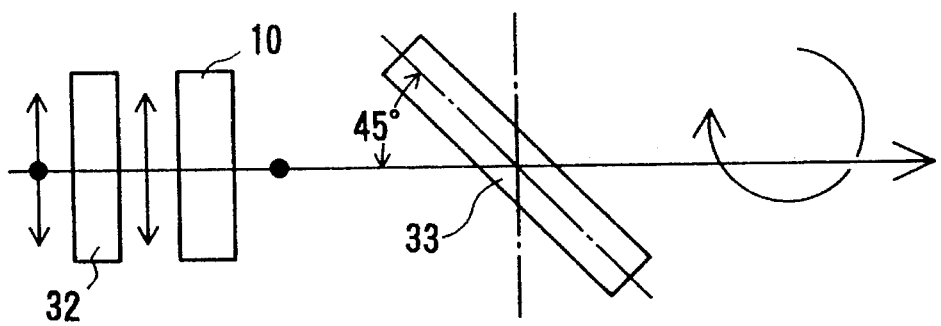
FIG. 13a is a view schematically showing optical switching performance given when a voltage signal is not input to a liquid crystal element of the liquid crystal light modulation device according to the present invention shown in FIG. 4.
Figure 13B:
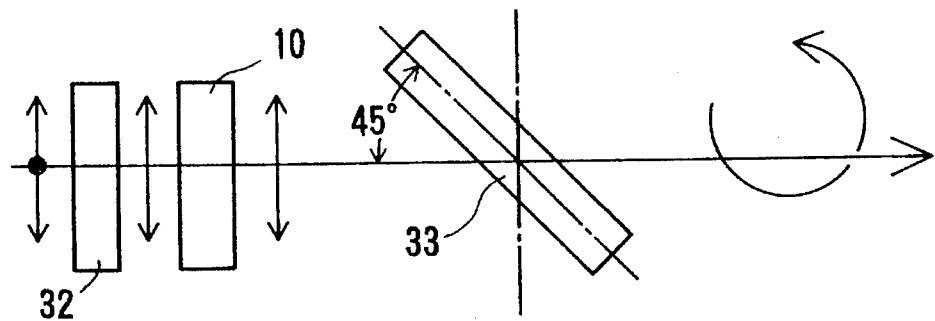
FIG. 13b is a view schematically showing, optical switching performance given when a voltage signal is input to a liquid crystal element of the liquid crystal light modulation device according to the present invention shown in FIG. 4.

As shown in FIG. 13a and FIG. 13b, a linear polarizing plate (32) is placed on the light incidence side of the liquid crystal element (10), and a ¼ wave plate (33) is arranged on the light exit side of the liquid crystal element (10) in such a manner that the optical axis is rotated by +45° or –45° around the axis which indicates a light proceeding direction on the liquid crystal element. In this arrangement, when a voltage signal is not input to the liquid crystal element (10), a polarized light of left-handed rotatory can be output, and when a voltage signal is input to the liquid crystal element (10), a polarized light of right-handed rotatory can be output.

As shown in FIG. 13a, the horizontally polarized light (*) released from the liquid crystal element (10) is output as a polarized light of left-handed rotatory through the ¼ wave plate (33).

As shown in FIG. 13b, the vertically polarized light ($\updownarrow$) released from the liquid crystal element (10) is output as a polarized light of right-handed rotatory through the ¼ wave plate (33).

A stereoscopic image free from a flicker can be observed in the following manner. The incidence side linear polarizing plate (32), the liquid crystal element (10), the voltage signal input means (20) and the ¼ wave plate (33) are used to construct the liquid crystal light modulation device (1) shown in FIG. 2. The liquid crystal light modulation device (1) is placed in front of a display screen in such a manner that the display screen can be seen by the observer through the liquid crystal element (10), images for being observed by each of right and left eyes are displayed on the display screen alternatively with time sharing, and open-close (on-off) operation of the light modulation device (1) is carried out synchronistically with the images. Further, a circularly polarized light filter which transmits only a polarized light of left-handed rotatory is fitted on the right eye of the observer, and a circularly polarized light filter which transmits only a polarized light of right-handed rotatory is fitted on the left eye of the observer. When an image displayed on the stereoscopic display device is observed in the above manner, the observer can observe a stereoscopic image free from a flicker.

The liquid crystal optical switching device (1) shown in FIG. 13a and FIG. 13b is another example of the third embodiment of the liquid crystal light modulation device of the present invention shown in FIG. 4.

In FIG. 13a and FIG. 13b, when the light incidence side linear polarizing plate (32) is provided at the output position of the light source and the liquid crystal light modulation device (1) is made up of the liquid crystal element (10), the voltage signal input means (20) and the ¼ wave plate (33), this liquid crystal optical switching device (1) is one example of the third embodiment of the liquid crystal light modulation device of the present invention shown in FIG. 3.

Alternatively, in place of the liquid crystal light modulation device (1) shown in FIGS. 13a, 13b, the liquid crystal light modulation device for observing stereoscopic images can be composed of a liquid crystal element (10) and a light polarization control means (20) when a linear light polarizing plate (32) is equipped with the emitting portion of a light source.

A stereoscopic image free from a flicker can be observed in the following manner.

The liquid crystal light modulation device (1) is placed in front of a display screen in such a manner that the display screen can be seen by the observer through the liquid crystal element (10), images for being observed by each of right and left eyes are displayed on the display screen alternatively with time sharing, and open-close (on-off) operation of the light modulation device (1) is carried out synchronistically with the images. Further, a lens whose polarization direction meets the polarization direction of the light incidence side linear polarizing plate at right angles is fitted on the right eye of the observer, and a lens whose polarization direction is parallel with the polarization direction of the light incidence side linear polarizing plate is fitted on the left eye of the observer. When the displayed images are observed in the above manner, the observer can observe a stereoscopic image free from a flicker.

The above liquid crystal light modulation device (1) shown in FIG. 12a and FIG. 12b is one example of the first embodiment of the liquid crystal light modulation device of the present invention shown in FIG. 1.

EFFECT OF THE INVENTION

The liquid crystal light modulation device according to the present invention can realize a high-speed change of a light path and a high-speed on-off operation of optical signals transmitted on the light path without narrowing the angle of visibility.

EXAMPLE 1

Two glass substrates, each having a transparent ITO electrode formed on one surface, were each spin-coated with polyimide (available from Japan Synthetic Rubber Co., Ltd.) on its ITO side surface, and they were heat-treated at 180° C. for 1 hour. The polyimide side surface of each glass substrate was subjected to strong rubbing (indentation depth: 0.7 mm) with polyamide fibre cloth, and the two substrates were then bonded to each other so that the rubbing directions of the two substrates were parallel with each other by way of spacers of spherical silica (available from Shokubai Kasei Kogyo K.K.) having a mean diameter of 5.5 μm corresponding to the later-described optimum cell thickness, to prepare a cell. Thereafter, a liquid crystal compound represented by the following formula was heated to liquid, then poured into the cell, and slowly cooled to 60° C. at a cooling rate of 1° C./min.

The above-mentioned liquid crystal compound was confirmed to be an antiferroelectric liquid crystal because the compound had such a relationship between the quantity of the transmitted light and the voltage curve as shown in FIG. 9b. When the extinction position was observed under crossed Nicols, the extinction position given when a voltage was applied was the position where the cell was rotated by +45° or −45° depending on the polarity of the applied voltage, based on the extinction position given when a voltage is not applied. This shows the tilt angle of the above liquid crystal molecule is about 45°.

A linear polarizing plate was arranged on the light incidence side of the liquid crystal cell. The direction of the liquid crystal cell was adjusted in such a manner that the optical axis of the antiferroelectric liquid crystal material layer in the liquid crystal cell was contained in the polarization plane of the light incident upon the liquid crystal cell through the linear polarizing plate when no voltage was applied to the liquid crystal cell. However, any polarization control means such as a linear polarizing plate was not provided on the light outgoing side of the liquid crystal cell.

With respect to the light which is released from the liquid crystal cell when a voltage was applied to the liquid crystal cell or when no voltage was applied thereto, an intensity $I_1$ of the light polarized in the optical axis direction of the linear polarizing plate and an intensity $I_2$ of the light polarized in the direction meeting the optical axis of the linear polarizing plate at right angles were measured. As the light source, a halogen lamp was used. A light released from the light source was spectrally processed to give a monochromatic light of 1.0 to 1.5 μm by means of a spectroscope, and this monochromatic light was allowed to enter the liquid crystal cell.

Figure 14:
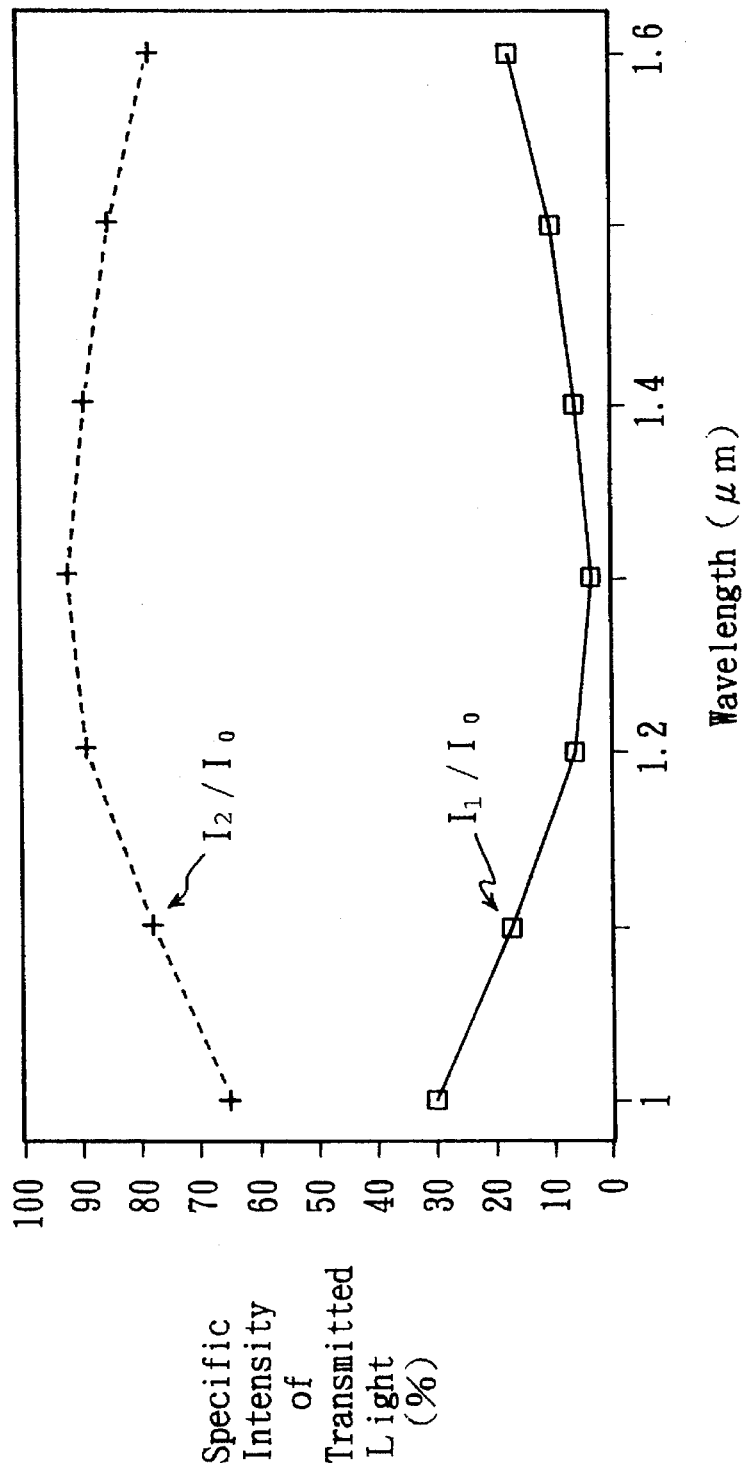
FIG. 14 is a view showing a change of a transmitted light through the liquid crystal cell in the liquid crystal light modulation device of Example 1.

The results of the measurement are shown in FIG. 14.

FIG. 14 shows that $I_1$ and $I_2$ have dependence on wavelength, and when the wavelength is in the vicinity of 1.3 μm, the value of $I_1$ is minimum, while the value of $I_2$ is maximum.

As is evident from the above, the polarization plane of the light transmitted through the liquid crystal cell is rotated by almost 90° in comparison between the case where a voltage is applied to the liquid crystal cell and the case where no voltage is applied thereto.

Further, the above-mentioned antiferroelectric liquid crystal compound had a birefringence anisotropy value of 0.12. When λ is 1.31 μm (i.e., when a semiconductor laser or diode laser having λ of 1.31 μm is used as the light source), the optimum thickness of the cell determined by the above formula (2) is 5.46 μm.

One liquid crystal cell prepared as above was arranged between a pair of polarization beam splitters as shown in FIG. 11a and FIG. 11b to prepare a light modulation device. When the light modulation device was irradiated with a semiconductor laser beam (wavelength: 1.31 μm), the crosstalk value determined by the above formula (1) was −15 dB. Further, when the voltage was on, an output A was obtained, and when the voltage was off, an output B was obtained.

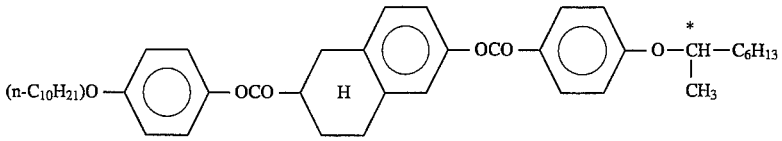

EXAMPLE 2

Three of liquid crystal cells each having a thickness of 1.7 µm were prepared using spacers of spherical silica having a mean diameter of 1.7 µm by using the same liquid crystal material with that of Example 1, in a manner similar to that of Example 1. The rubbing with polyamide fibre cloth was carried out under milder conditions (indentation depth: 0.5 mm) than those in Example 1. The liquid crystal cells thus prepared showed more uniform orientation having decreased defects as compared with the liquid crystal cell of Example 1.

The three liquid crystal cells prepared in the above were placed in series between a pair of polarization beam splitters to prepare such a liquid crystal light modulation device as shown in FIG. 11. The crosstalk value as given by the above formula (I) was measured in the same manner as described in Example 1. As a result, the crosstalk value was −20 dB. Further, when the voltage was on, an output A was obtained, and when the voltage was off, an output B was obtained.

EXAMPLE 3

A light modulation device containing a ferroelectric liquid crystal material (ZLI3489, available from Merck Co.) and having the same structure as the light modulation device of Example 1 was measured to obtain a crosstalk value as given by the above formula (1). As a result, the crosstalk value was −10 dB.

EXAMPLE 4

A light modulation device containing a ferroelectric liquid crystal material (ZLI3489, available from Merck Co.) and having the same structure as the light modulation device of Example 2 was measured to obtain a crosstalk value as given by the above formula (1). As a result, the crosstalk value was −15 dB.

EXAMPLE 5

The procedure for preparing a liquid crystal cell in Example 1 was repeated except for using spherical silica spacers having a mean diameter of 2.4 µm, to prepare a liquid crystal cell. Thereafter, an antiferroelectric liquid crystal compound represented by the following formula was heated to liquid, then poured into the liquid crystal cell, and slowly cooled to 43° C. at a cooling rate of 1° C./min.

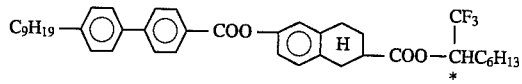

When the extinction position was observed under crossed Nicols, the extinction position given when a voltage was applied was the position where the liquid crystal cell was rotated by +22.5° or −22.5° depending on the polarity of the applied voltage, based on the extinction position given when a voltage is not applied. This shows the tilt angle of the above liquid crystal molecule is about 22.5°.

A linear polarizing plate was arranged on the light incidence side of the liquid crystal cell. The direction of the liquid crystal cell was adjusted in such a manner that the optical axis of the antiferroelectric liquid crystal material layer in the liquid crystal cell was contained in the polarization plane of the light incident upon the liquid crystal cell through the linear polarizing plate when an electric field of positive polarity (+15 V/µm) was applied to the liquid crystal cell. However, any polarization control means such as a linear polarizing plate was not provided on the light outgoing side of the liquid crystal cell.

With respect to the light which is released from the liquid crystal cell when an electric field of positive polarity (+15 V/µm) was applied to the liquid crystal cell or when an electric field of negative polarity (−15 V/µm) was applied thereto, and intensity $I_1$ of the light polarized in the optical axis direction of the linear polarizing plate and an intensity $I_2$ of the light polarized in the direction meeting the optical axis of the linear polarizing plate at right angels were measured. As the light source, a halogen lamp was used. A light released from the light source is spectrally processed to give a monochromatic light of 0.4 to 0.7 µm by means of a spectroscope, and this monochromatic light is allowed to enter the liquid crystal cell.

The results of the measurement are shown in FIG. 15.

FIG. 15 shows that $I_1$ and $I_2$ have dependence on wavelength, and when the wavelength is in the vicinity of 0.63 µm, the value of $I_1$ is minimum, while the value of $I_2$ is maximum.

As is evident from the above, the polarization plane of the light transmitted through the liquid crystal cell is rotated by almost 90° in comparison between the case where an electric field of positive polarity (+15 V/µm) is applied to the liquid crystal cell and the case where an electric field of negative polarity (−15 V/µm) is applied thereto.

One linear polarizing plate was placed in front of the liquid crystal cell, and the direction of the liquid crystal cell was adjusted in such a manner that the optical axis given when an electric field (+15 V/µm) of positive (+) polarity was formed in the antiferroelectric liquid crystal material layer was contained in the polarization plane of the light incident upon the liquid crystal cell through the linear polarizing plate. Further, another linear polarizing plate was placed on the light outgoing side of the liquid crystal cell in the direction of the crossed Nicols against the above-mentioned light incidence side linear polarizing plate. Then, the light transmitted through the linear polarizing plate at the light incidence side, the liquid crystal cell and the linear polarizing plate at the light outgoing side in sequence was measured on the intensities. As the light source, a halogen lamp was used, and a light of 630 nm obtained by spectrally processing a light released from the light source by means of a monochromator was used as the input light.

As a result of the measurement, a ratio $[I(-)/I(+)]$ of the output light intensity $I(-)$ given when an electric field (−15 V/µm) of negative (−) polarity was formed in the antiferroelectric liquid crystal material layer to the output light intensity $I(+)$ given when an electric field (+15 V/µm) of positive (+) polarity was formed in the antiferroelectric liquid crystal material layer was 78. This ratio corresponds to a contrast. The time required for completion of the change of the output light intensity after the change of the voltage polarity was 200 µsec.

EXAMPLE 6

The output light intensities were measured in the same manner as described in Example 5 except that a ¼ wave plate was arranged, in place of the light outgoing side linear polarizing plate, in such a manner that the optical axis of the ¼ wave plate was positioned at the center between the optical axis of the antiferroelectric liquid crystal material layer given when a voltage of positive (+) polarity was applied to the liquid crystal cell and the optical axis of the antiferroelectric liquid crystal material layer given when a voltage of negative (−) polarity was applied to the cell.

As a result, I(+) was almost equal to I(−). Then, a circularly polarized light filter was arranged on the light output side of the aforementioned wave plate. The intensities of the light which was output from the circularly polarized light filter were measured to obtain a ratio [I (−)/I(+)]. As a result, the ratio [I(−)/I(+)] was 78.

What is claimed is:

1. A liquid crystal element consisting of
at least one liquid crystal cell, each liquid crystal cell comprising
a pair of spaced apart transparent substrates, each of said substrates having laminated thereon in the following order,
a transparent electrode and
a transparent orientation control film, and
an antiferroelectric liquid crystal material layer sandwiched between said orientation control films; and
voltage signal input means electrically connected with each of said transparent electrodes;
wherein the polarization direction of a linear polarized monochromatic light transmitted by the liquid crystal element changes by approximately 90° when a given voltage signal is input to the liquid crystal element from the voltage signal input means; and
wherein the antiferroelectric liquid crystal material layer is formed from liquid crystal molecules having a tilt angle of 21° to 24°,
the thickness d (μm) of the antiferroelectric liquid crystal material layer contained in the liquid crystal cell for forming the liquid crystal element satisfies the following formula:

$$d=\lambda/2(n_c-n_o)$$

wherein $n_c$ is a refractive index of the liquid crystal molecule of the antiferroelectric liquid crystal material layer in the major axis direction in the case where the given voltage signal is input to the liquid crystal element, $n_o$ is a refractive index of the liquid crystal molecule of the antiferroelectric liquid crystal material layer in the minor axis directions in the above case, and λ (μm) is a wavelength of a light incident on the liquid crystal element, said λ is in the range of 0.4 to 0.7 μm, and d is in the range of 1.5 to 4 μm, with the proviso that when the liquid crystal element has more than one antiferroelectric liquid crystal material d is the total thickness of the antiferroelectric liquid crystal material layers;
said device further comprising a linear polarization plate placed at the light incidence side of said liquid crystal element, and
optionally, a ¼ wave plate placed on the light outgoing side of the liquid crystal element.

2. A liquid crystal element consisting of
at least one liquid crystal cell, each liquid crystal cell comprising
a pair of spaced apart transparent substrates, each of said substrates having laminated thereon in the following order,
a transparent electrode and
a transparent orientation control film, and
an antiferroelectric liquid crystal material layer sandwiched between said orientation control films; and
voltage signal input means electrically connected with each of said transparent electrodes;
wherein the polarization direction of a linear polarized monochromatic light transmitted by the liquid crystal element changes by approximately 90° when a given voltage signal is input to the liquid crystal element from the voltage signal input means; and
wherein the antiferroelectric liquid crystal material layer is formed from liquid crystal molecules having a tilt angle of 21° to 24°,
the thickness d (μm) of the antiferroelectric liquid crystal material layer contained in the liquid crystal cell for forming the liquid crystal element satisfies the following formula:

$$d=\lambda/2(n_c-n_o)$$

wherein $n_c$ is a refractive index of the liquid crystal molecule of the antiferroelectric liquid crystal material layer in the major axis direction in the case where the given voltage signal is input to the liquid crystal element, $n_o$ is a refractive index of the liquid crystal molecule of the antiferroelectric liquid crystal material layer in the minor axis directions in the above case, and λ (μm) is a wavelength of a light incident on the liquid crystal element material layer, with the proviso that when the liquid crystal element has more than one antiferroelectric liquid crystal material d is the total thickness of the antiferroelectric liquid crystal material layers in all such cells; said device further comprising said λ is 0.8 μm or more, and d is in the range of 3 to 9 μm, a polarization beam splitter placed at each of the light incidence side and light outgoing side of said liquid crystal element.

3. A liquid crystal element consisting of
at least one liquid crystal cell, each liquid crystal cell comprising
a pair of spaced apart transparent substrates, each of said substrates having laminated thereon in the following order,
a transparent electrode and
a transparent orientation control film, and
an antiferroelectric liquid crystal material layer sandwiched between said orientation control films; and
voltage signal input means electrically connected with each of said transparent electrodes;
wherein the polarization direction of a linear polarized monochromatic light transmitted by the liquid crystal element changes by approximately 90° when a given voltage signal is input to the liquid crystal element from the voltage signal input means; and
wherein the antiferroelectric liquid crystal material layer is formed from liquid crystal molecules having a tilt angle of 42° to 48°,
the thickness d (μm) of the antiferroelectric liquid crystal material layer contained in the liquid crystal cell for forming the liquid crystal element satisfies the following formula:

$$d=\lambda/2(n_c-n_o)$$

wherein $n_c$ is a refractive index of the liquid crystal molecule of the antiferroelectric liquid crystal material layer in the major axis direction in the case where the given voltage signal is input to the liquid crystal element, $n_o$ is a refractive index of the liquid crystal molecule of the antiferroelectric liquid crystal material layer in the minor axis directions in the above case, and λ (μm) is a wavelength of a light incident on the liquid crystal element, said λ is in the range of 0.4 to 0.7 μm, and d is in the range of 1.5 to 4 μm, with the provisa that when the liquid crystal element has more than one antiferroelectric liquid crystal material d is the total thickness of the antiferroelectric liquid crystal material layers in all such cells; said device further comprising a linear polarization plate placed at the light incidence side of said liquid crystal element, and optionally, a ¼ wave plate placed on the light outgoing side of the liquid crystal element.

4. A liquid crystal element consisting of at least one liquid crystal cell, each liquid crystal cell comprising
- a pair of spaced apart transparent substrates, each of said substrates having laminated thereon, in the following order,
- a transparent electrode and
- a transparent orientation control film, and
- an antiferroelectric liquid crystal material layer sandwiched between said orientation control films; and voltage signal input means electrically connected with each of said transparent electrodes;

wherein the polarization direction of a linear polarized monochromatic light transmitted by the liquid crystal element changes by approximately 90° when a given voltage signal is input to the liquid crystal element from the voltage signal input means; and wherein the antiferroelectric liquid crystal material layer is formed from liquid crystal molecules having a tilt angle of 42° to 48°, the thickness d (μm) of the antiferroelectric liquid crystal material layer contained in the liquid crystal cell for forming the liquid crystal element satisfies the following formula:

$$d = \lambda/2(n_c - n_o)$$

wherein $n_c$ is a refractive index of the liquid crystal molecule of the antiferroelectric liquid crystal material layer in the major axis direction in the case where the given voltage signal is input to the liquid crystal element, $n_o$ is a refractive index of the liquid crystal molecule of the antiferroelectric liquid crystal material layer in the minor axis directions in the above case, and $\lambda$ (μm) is a wavelength of a light incident on the liquid crystal element, said $\lambda$ is 0.8 μm or more, and d is in the range of 3 to 9 μm, with the proviso that when the liquid crystal element has more than one antiferroelectric liquid crystal d is the total thickness of the antiferroelectric liquid crystal material layers in all such cells; said device further comprising a polarization beam splitter placed at each of the light incidence side and light outgoing side of said liquid crystal element.

* * * * *

UNITED STATES PATENT AND TRADEMARK OFFICE
CERTIFICATE OF CORRECTION

PATENT NO. : 5,589,966
DATED : December 31, 1996
INVENTOR(S) : HIDEO HAMA, ET AL.

Page 1 of 2

It is certified that error appears in the above-indentified patent and that said Letters Patent is hereby corrected as shown below:

In Claim 1:

Col. 19, line 10, delete "liquid crystal element consisting" and insert --liquid crystal light modulation device comprising a liquid crystal element consisting--;

line 36, delete "$d=\lambda/2(n_c-n_o)$" and insert --$d=\lambda/2(n_e-n_o)$--; and line 38, delete "$n_c$" and insert --$n_e$--.

In Claim 2:

Col. 19, line 56, delete "liquid crystal element consisting" and insert --liquid crystal light modulation device comprising a liquid crystal element consisting--.

Col. 20, line 15, delete "$d=\lambda/2(n_c-n_o)$" and insert --$d=\lambda/2(n_e-n_o)$"; and line 17, delete "$n_c$" and insert --$n_e$--.

In Claim 3:

Col. 20, line 32, delete "liquid crystal element consisting" and insert --liquid crystal light modulation device comprising a liquid crystal element consisting;

line 58, delete "$d=\lambda/2(n_c-n_o)$" and insert --"$d=\lambda/2(n_e-n_o)$--; and

UNITED STATES PATENT AND TRADEMARK OFFICE
CERTIFICATE OF CORRECTION

PATENT NO. : 5,589,966

DATED : December 31, 1996

INVENTOR(S) : HIDEO HAMA, ET AL.

It is certified that error appears in the above-identified patent and that said Letters Patent is hereby corrected as shown below:

line 60, delete "$n_c$" and insert --$n_e$--.

In Claim 4:

Col. 21, line 10, delete "liquid crystal element consisting" and insert --liquid crystal light modulation device comprising a liquid crystal element consisting--.

Col. 22, line 10, delete "$d=\lambda/2(n_c-n_o)$" and insert --$d=\lambda/2(n_e-n_o)$--;

and line 12, delete "$n_c$" and insert --$n_e$--.

Signed and Sealed this

Fourth Day of November, 1997

*Attest:*

BRUCE LEHMAN

*Attesting Officer*      *Commissioner of Patents and Trademarks*